(12) United States Patent
Sartini

(10) Patent No.: US 7,297,870 B1
(45) Date of Patent: Nov. 20, 2007

(54) UNITIZED FIXTURE FRAME AND JUNCTION BOX AND METHOD OF FORMING SAME

(75) Inventor: Gene Sartini, Fall River, MA (US)

(73) Assignee: Genlyte Thomas Group, LLC, Louisville, KY (US)

( * ) Notice: Subject to any disclaimer, the term of this patent is extended or adjusted under 35 U.S.C. 154(b) by 0 days.

(21) Appl. No.: 11/135,304

(22) Filed: May 23, 2005

(51) Int. Cl.
*H02G 3/08* (2006.01)

(52) U.S. Cl. .................... 174/50; 174/63; 362/148; 248/57

(58) Field of Classification Search ............... 174/50, 174/63, 65 R; 248/57, 343; 200/297; 362/148
See application file for complete search history.

(56) References Cited

U.S. PATENT DOCUMENTS

| | | | |
|---|---|---|---|
| 4,274,615 A | 6/1981 | Chan et al. | |
| 4,336,575 A * | 6/1982 | Gilman | 362/147 |
| 4,408,262 A | 10/1983 | Kusmer | |
| 5,662,414 A | 9/1997 | Jennings et al. | |
| 5,857,766 A | 1/1999 | Sieczkowski | |
| 6,461,016 B1 | 10/2002 | Jamison et al. | |
| 6,691,968 B1 | 2/2004 | Tseng | |
| 7,118,254 B2 * | 10/2006 | Czech | 362/365 |
| 2005/0231954 A1 * | 10/2005 | Czech | 362/263 |

* cited by examiner

*Primary Examiner*—Dhiru R. Patel
(74) *Attorney, Agent, or Firm*—James E. Cole; Middleton Reutlinger

(57) ABSTRACT

A fixture frame having a junction box formed from a blank and an integrally connected frame arm connected to the junction box and formed from the blank. The frame arm is formable in a plurality of configurations for receiving a corresponding plurality of ring aperture sizes.

13 Claims, 9 Drawing Sheets

UNITIZED FIXTURE FRAME AND JUNCTION BOX AND METHOD OF FORMING SAME

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a recessed downlight mounting fixture frame. More specifically, the present invention relates to recessed downlight mounting fixture frame which may be utilized with a plurality of recessed lighting sizes but is formed from a single blank and therefore improves manufacturing efficiency.

2. Description of the Related Art

Recessed downlights have become increasingly popular for use in both commercial and residential constructions and as a result, competition has increased dramatically in this lighting area. One reason for the increased popularity is that the recessed downlight fixtures meet a wide range of interior lighting requirements while also being aesthetically pleasing. The recessed lighting fixtures come in various sizes and therefore can be used in multiple arrangements depending on room size, ceiling height and desired brightness. Further these recessed downlight fixtures may be installed in new constructions as well as existing ceilings and therefore installers like using them. Typically, ceiling-mounted recessed downlight fixtures comprise a frame or frame-in kit with a fixture frame connection means for retaining the fixture frame between structural supports of the ceiling.

Fixture frames are an integral component of the recessed downlight and hold the fixture, reflector, reflector trim, lamp and other parts in place. As previously described, the recessed downlights come in various sizes and therefore require fixture frames to be formed in corresponding various sizes to retain the fixtures. Since distinct frames must be formed for each size light fixture, manufacturing efficiency is decreased. Specifically, forming separate fixture frames for each lighting size is difficult because it raises tooling and manufacturing costs while decreasing production output.

Given the foregoing deficiencies, it will be appreciated that a recessed downlight mounting fixture frame is needed which is formed from a single blank which therefore increases manufacturing efficiency and maybe utilized with various fixture sizes.

SUMMARY OF THE INVENTION

With regard to the foregoing, the present invention eliminates the oversights, difficulties, and disadvantages of the prior art by providing a recessed downlight mounting fixture frame.

According to one embodiment, a fixture frame comprises a frame arm having a first end and a second end, the frame arm further comprising a first elbow and a second elbow between the first end and the second end. A junction box is integrally connected to the frame arm between the first elbow and the second elbow, the frame arm has multiple bend positions defining the first and second elbows. The fixture frame is formed from a single blank and includes mounting means. The fixture frame can receive aperture rings of multiple diameters at two opposed locations.

According to a second embodiment, a fixture frame comprises a junction box integrally formed with a frame arm, the frame arm has first and second ends, the junction box is disposed between the first and second ends. The frame arm has multiple bend positions defining first and second elbows. The junction box and the frame arm are formed from a single blank and capable of receiving multiple aperture ring sizes.

According to yet another embodiment, a fixture frame comprises a junction box formed from a blank and an integrally connected frame arm connected to said junction box and formed from said blank. The frame arm is formable to a plurality of configurations for receiving a corresponding plurality of ring aperture sizes.

According to still another embodiment, a fixture frame comprises a junction box and a frame arm formed from a single metal blank, the frame arm has a first arm portion, a second arm portion and a third arm portion defining a substantially U-shape. The junction box is integrally connected to the first arm portion and the frame arm has elbows disposed between the first arm portion and the second arm portion as well as the first arm portion and the third arm portion. The elbows being formable in various positions to vary a preselected distance between the second arm portion and the third arm portion. A method of forming fixture frame, comprising:

A final embodiment of forming the fixture frame has a junction box and an integral frame arm wherein the fixture frame is formed from a single blank of material and receives multiple aperture ring sizes, comprises the steps of forming one of the junction box and the frame arm from the single blank, forming the other of the junction box and the frame arm from the single blank, and forming the frame arm to receive one of the multiple aperture ring sizes.

A method of forming fixture frame having a junction box and an integral frame arm wherein the fixture frame is formed from a single blank of material and can receive multiple aperture ring sizes comprises the steps of forming one of the junction box and the frame arm from said single blank in a progressive die, forming the other of the junction box and the frame arm from the single blank in a progressive die; forming the frame arm to receive one of the multiple aperture ring sizes in a secondary tooling.

Several benefits and advantages are derived from the broad method and/or the embodiment of the invention. The instant invention provides a single blank which may be manufactured and formed into a junction box and integral frame arm. The frame arm may be formed into a plurality of shapes during manufacture in order to receive a corresponding plurality of aperture ring sizes.

DETAILED DESCRIPTION

Figure 1:
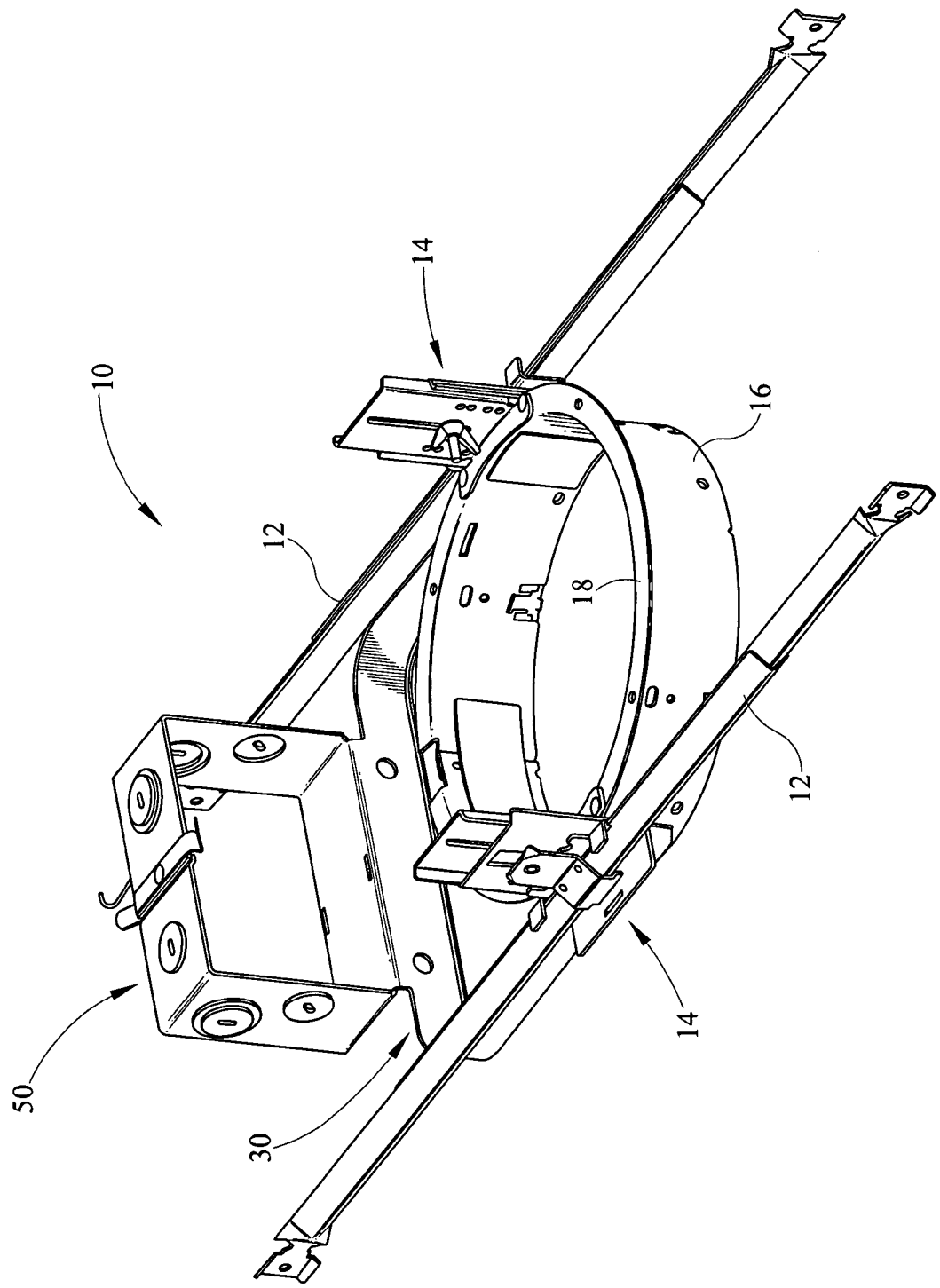
FIG. 1 is a perspective view of a fixture frame-in kit including a unitized frame and junction box of the present invention.

It shall be understood that the invention is not limited in its application to the details of construction and the arrangement of components set forth in the following description or illustrated in the drawings. The invention is capable of other embodiments and of being practiced or of being carried out in various ways. Also, it shall be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are shown in FIGS. 1 through 9 various aspects of a recessed downlight fixture frame both before and after manufacture. The fixture frame is formed from a single sheet of material or blank form utilizing a progressive die in order to improve manufacturing efficiency, reduce waste, and reduce cost of materials utilized in manufacturing the mounting fixture. Further, a single fixture frame blank may be utilized to form a fixture frame for use with light fixtures and reflectors of various sizes.

Referring initially to FIG. 1, a perspective view of a recessed downlight mounting or frame-in kit 10 is depicted. The frame-in kit 10 is typically positioned above an interior ceiling to provide useable downlight as well as reduce glare seen by those utilizing the room, or within an over-hanging eve on the exterior of a building. The frame-in kit 10 is preferably formed of a formable metallic material, such as steel, aluminum or other such lightweight metal. The frame-in kit of FIG. 1 comprises a plurality of hanger bars 12 which extend between joists or suspended ceiling members (not shown). An exemplary embodiment of the hanger bars 12 is described in U.S. patent application Ser. No. 11/117,680, which is incorporated by reference herein. The hanger bars 12 are connected to the frame-in kit 10 by a clip mechanism 14 which retains the slidable relationship between adjacent hanger bars 12 and also provides adjustability in a vertical dimension. When the hanger bars 12 are connected to ceiling members. The frame-in kit 10 remains suspended therebetween and above ceiling level.

Figure 2:
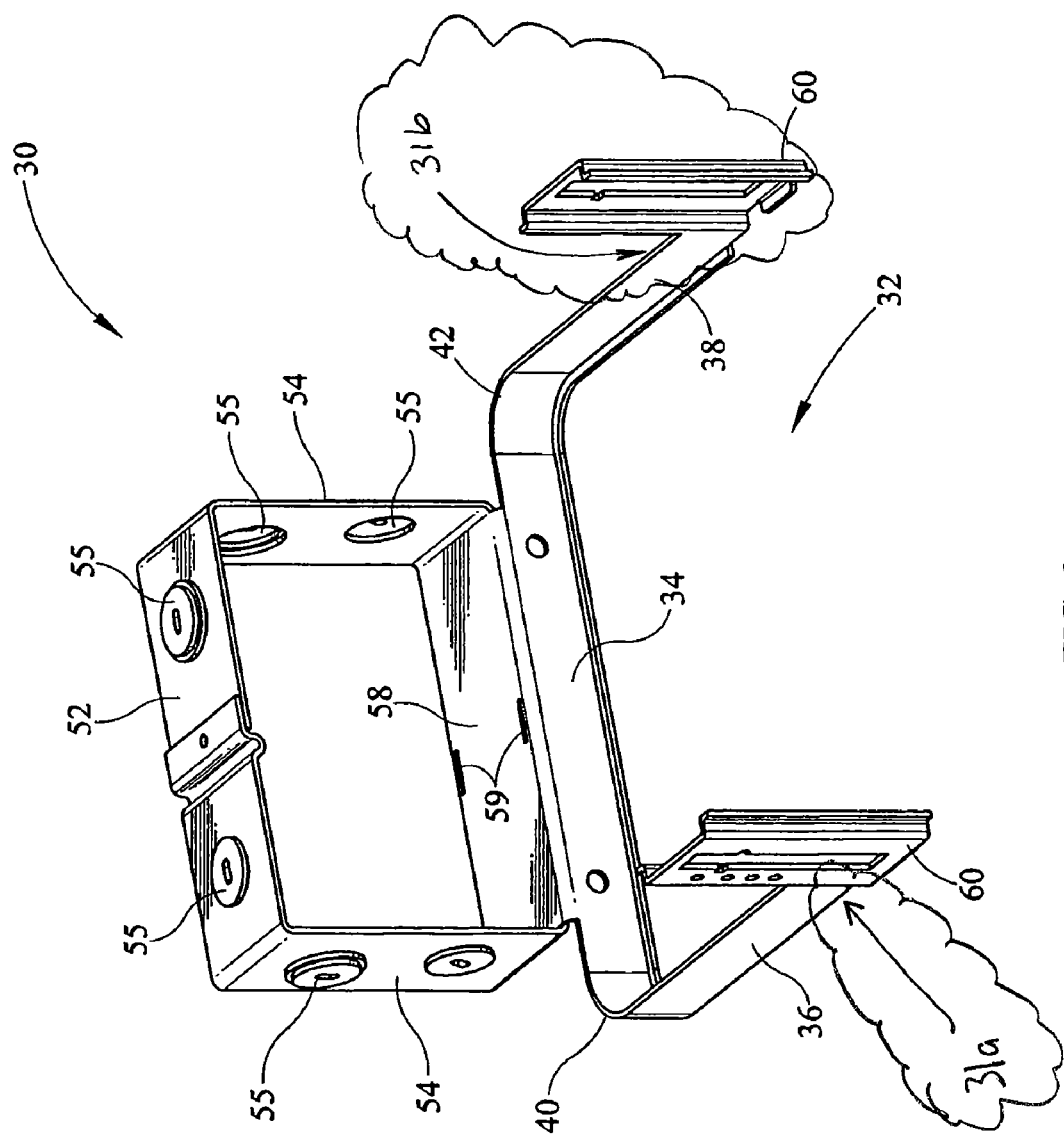
FIG. 2 is a perspective view of the unitized frame and junction box of FIG. 1.

The frame-in kit 10 further comprises an aperture ring 16 which is disposed along inside surfaces of a fixture frame 30. The aperture ring 16 functions to retain a housing or "can" (not shown) wherein various lighting components are located, including but not limited to, the lamp socket, the lamp, the reflector and trim. The aperture ring 16 is substantially cylindrical in shape with a flat upper surface 18 connected to the clip mechanism 14. As described further herein, a single fixture frame 30 can receive multiple ring sizes and therefore multiple housing or "can" sizes. This As shown in FIGS. 1 and 2, a fixture frame 30 comprises a frame arm 32 and an integral junction box 50. First, the junction box 50 comprises a top wall 52, a bottom wall opposite the top wall 52 and opposed side walls 54,56 extending between the top wall 52 and bottom wall 58. The junction box 50 defines a position where wire splices may be located providing electrical communication between a ballast (not shown) and a light source or lamp, such as a high intensity discharge (HID) lamp (not shown). The junction box top wall 152, bottom wall 158 and side walls 54,56 further define front and rear openings which are substantially rectangular or square in shape. Junction box doors (not shown) are disposed over the openings in order to close the junction box 50 per applicable electrical codes. The junction box doors (not shown) are connected to the junction box by door apertures 59 located in the bottom wall 58 of the junction box 50 as well as an arm or spring 53 (FIG. 6) extending across the top wall 52. Otherwise stated, the junction box doors have tabs extending into the apertures 59 to retain a bottom edge of each door while the top edge of each door is retained against the junction box top wall 52 by an arm (FIGS. 1 and 6) extending across the junction box top wall 52.

The junction box side walls 54,56 and the top wall 52 each comprise a plurality of knockouts 55. The knockouts 55 provide a plurality of wire paths for electrical wires and conduit to move from the ballast (not shown) to within the junction box 50 and from within the junction box 50 to the lamp (not shown).

The fixture frame 30 further comprises a frame arm 32 integrally connected to the junction box 50 having a first end 31*a* and second end 31*b* each comprising a mounting bracket 60 along an inside edge of the bottom wall 58. The mounting means 60 are utilized for connection of the aperture ring 16. More specifically, the frame arm 32 comprises a first arm portion 34, integrally connected to the junction box 50, and having first and second distal ends. The frame arm 32 further comprises a second arm portion 36 and a third arm portion 38. At a first end of the first arm portion 34 is a first elbow 40 and at a second end of the first arm portion 34 is a second elbow 42. The first and second elbows 40, 42 connect the first arm portion 34 to the second arm portion 36 and third arm portion 38, respectively. Thus, the frame arm 32 is defined by the first arm portion 34, second arm portion 36 and third arm portion 38. At distal ends of the second and third arm portions 36, 38 are opposed mounting brackets 60 which connect the clip mechanism 14 (FIG. 1). As will be discussed further, the frame arm 32 is manufactured from a single blank into various configurations to allow the fixture frame 30 to receive various aperture ring sizes.

The elbows 40, 42 are formed at ends of the first arm portion 34 to partially define a pre-selected spacing between the second arm portion 36 and the third arm portion 38 as well as between the mounting brackets 60. As shown in FIG. 1, the spacing between the second and third arm portions 36, 38 and the opposed mounting brackets 60 is provided to receive the aperture ring 16 wherein a reflector and lamp may be located. The elbows 40, 42 may be disposed at various positions and in various orientations in order to change the configuration of the blank so that a single blank may be utilized to form a fixture frame which may be used in combination with various light fixture sizes. Thus, although the first, second and third arm portions are described as part of the frame arm 32, the elbows are the structural feature which distinguish these portions from one another.

One advantage of the instant invention is that a single frame 30 may be utilized to receive multiple aperture ring sizes. Accordingly, various size reflectors may be utilized with the frame 30. A further advantage of the present invention is that the frame 30 may be formed from a single blank and may be manufactured to receive various reflector sizes, as described herein.

Figure 3:
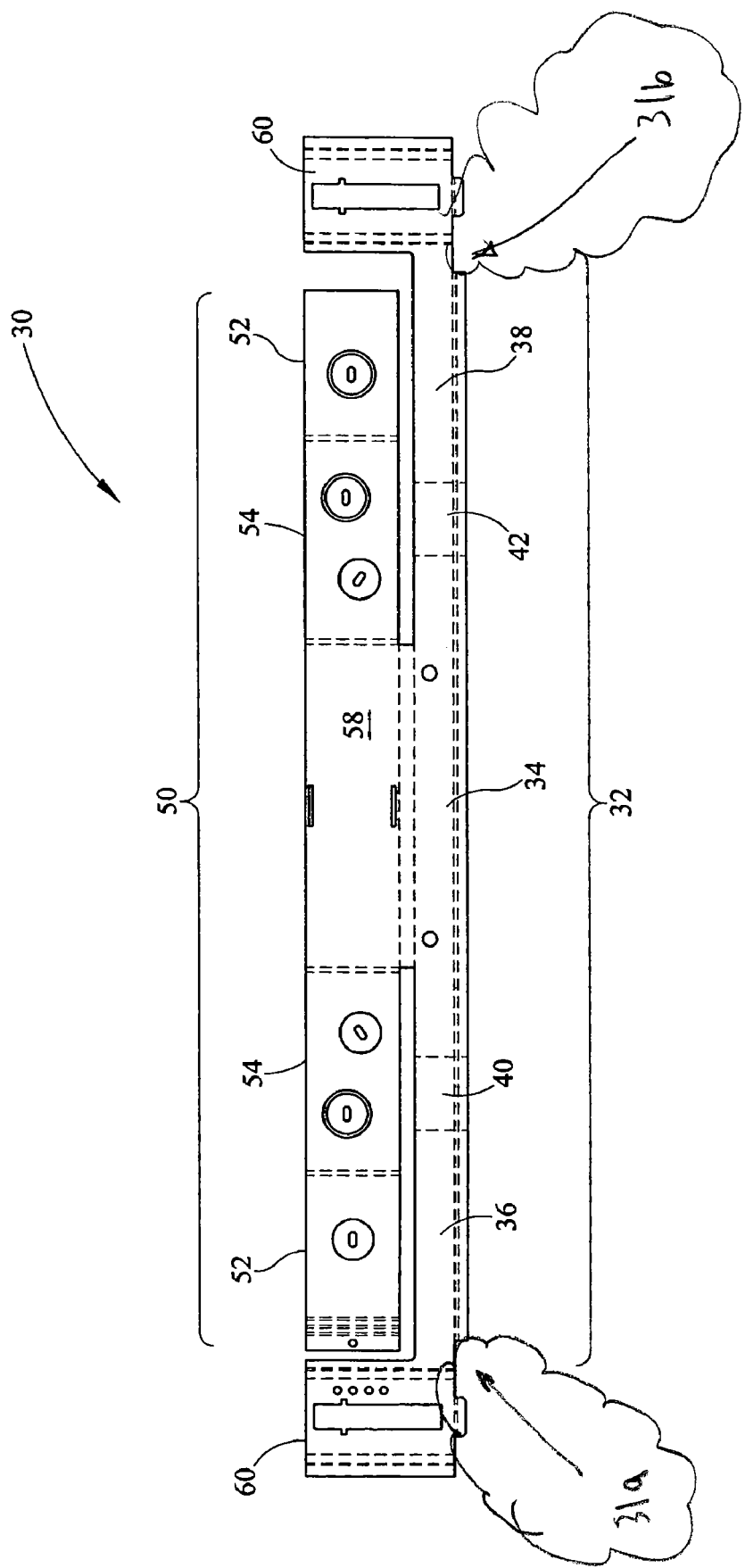
FIG. 3 is a top view of the unitized frame and junction box of FIG. 2 laid out on a sheet of material which defines a blank.

Referring now to FIGS. 3-6, the fixture frame 30 is shown in various views from the starting point of a blank piece of metal through various tooling processes to form the fixture frame 30 shown in FIG. 2. The fixture frame 30 is depicted in FIG. 3 as a blank prior to any folding processes by tooling equipment during manufacturing. The blank layout of the fixture frame 30 is depicted with solid lines representing the edges of the cut blank while fold lines generally shown as broken lines along the blank and is formed in a progressive die. As previously described, the fixture frame 30 has a junction box 50 comprising a bottom wall 58, opposed side walls 54,56 and two surfaces which are folded to generally form the top wall 52. Integrally connected to the junction box is the frame arm 32, which is defined by the first arm portion 34, the second arm portion 36 and the third arm portion 38, the latter portions 36, 38 disposed at the opposed ends of the first arm portion. The blank also reveals the elbows 40, 42 generally distinguishing the first arm portion 34 from the second and third arm portions 36, 38 as will be described further herein.

Figure 4:
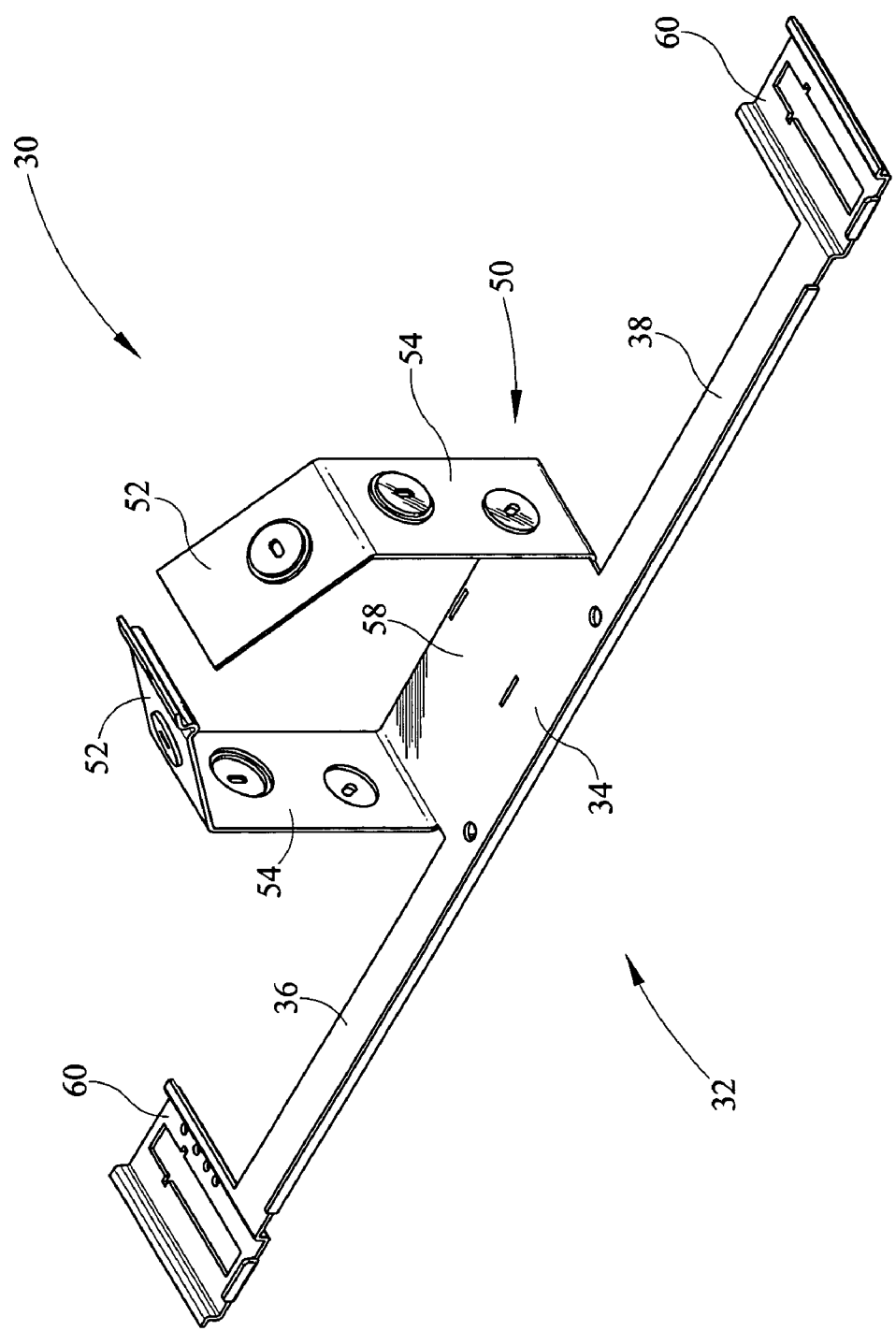
FIG. 4 is a top view of the unitized frame and junction box of FIG. 2.

Referring now to FIG. 4, the fixture frame 30 is shown in a perspective view. The junction box 50 is formed in the progressive die and is shown partially formed by folding the side walls 54,56 at opposed edges of the bottom wall 58. As the side walls 54,56 are folded upwardly the two sections defining the top wall 52 are also folded such that the junction box is partially formed. Preferably, the junction box 50 is fully formed in the progressive die but is depicted in the FIGS. 3-6 to show the progression of bends made to form the junction box 50. The frame arm 32 is still depicted in its flattened position so that the elbows are not distinguishing the first arm portion 34 from the second and third arm portions 36, 38.

Figure 5:
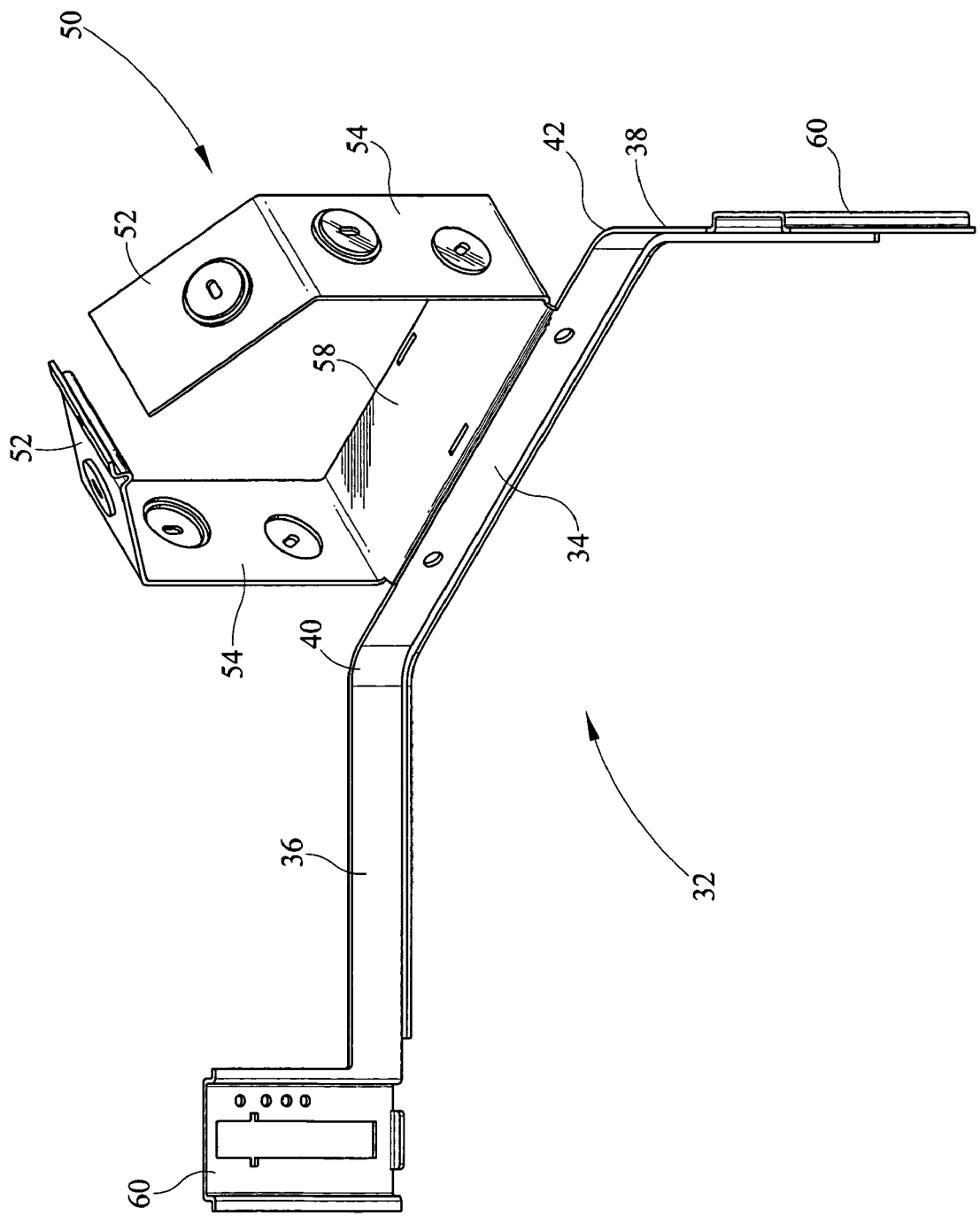
FIG. 5 is a side view of the unitized frame and junction box of FIG. 2.

Referring now to FIG. 5, the junction box 50 is again shown in its partially completed position. The frame arm 32 is folded at a substantially perpendicular angle to the junction box 50, which may be performed in the progressive die or a secondary tooling. Further, the frame arm 32 is shown with elbows 40 and 42 distinguishing the first arm portion 34 from the second and third arm portions 36, 38. The frame arm 32 is bent in a secondary tooling to begin forming the elbows 40,42. The elbows 40, 42 are not fully formed since the first and second arm portions 36, 38 are not fully disposed in a parallel configuration, as depicted in FIG. 2. Depending on the size/embodiment of the fixture frame 30 being formed, as discussed further herein, different secondary toolings may be utilized.

Figure 6:
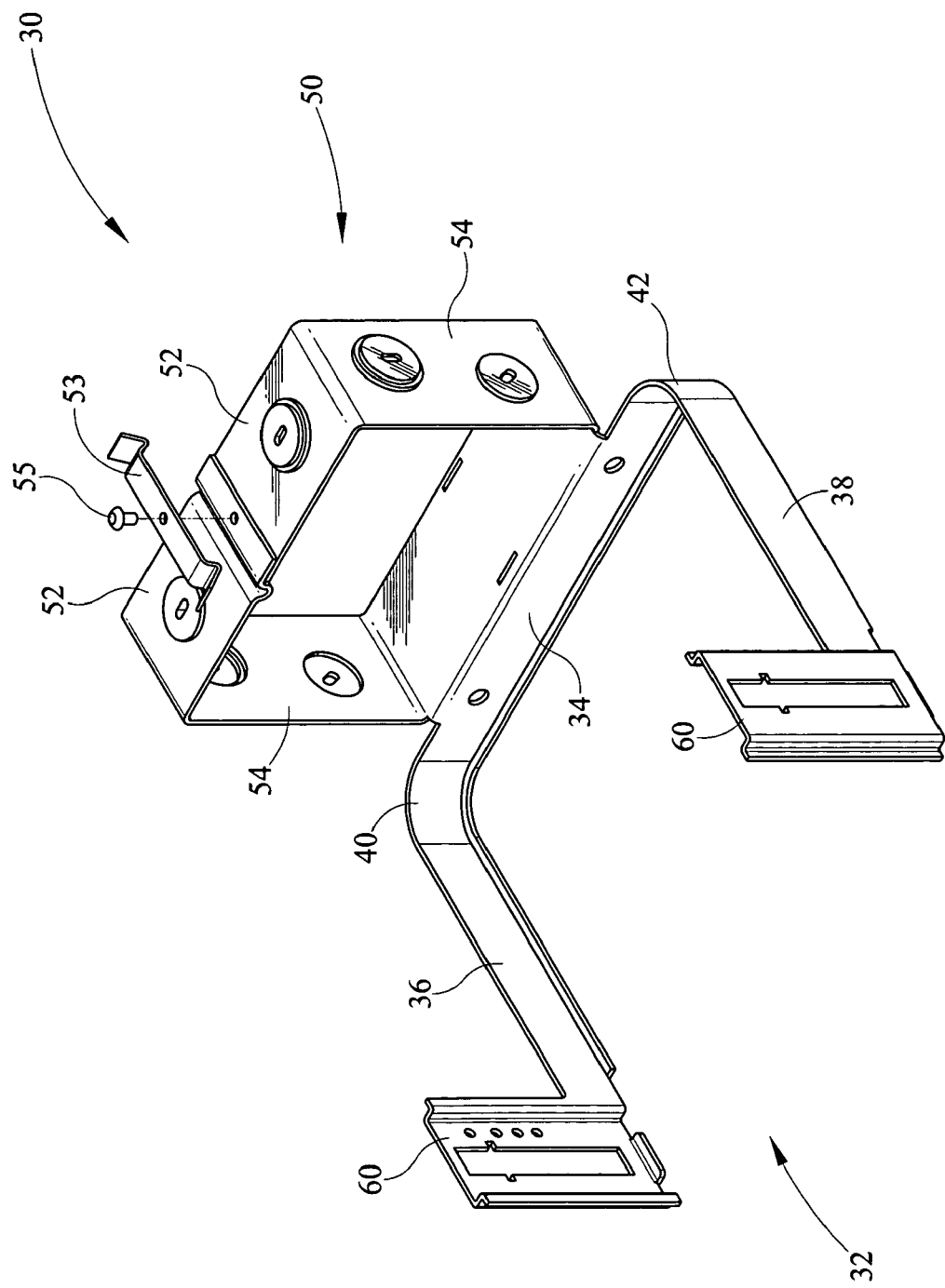
FIG. 6 is a perspective view of a first alternative embodiment.

Referring now to FIG. 6, the junction box 50 is fully folded so that the two upper surfaces defining the top wall are properly oriented and aligned to receive a junction box door retaining arm or spring 53 and fastener, such as a rivet or screw. Further, the frame arm 32 is fully folded in a secondary tooling to its substantially U-shaped configuration so that the elbows 40, 42 are fully formed. As a result, the second and third arm portions 36, 38 are parallel to one another and substantially perpendicular to the first arm portion 34. Further, in this position, the mounting brackets 60, are also parallel to properly receive an aperture ring of a pre-selected specific size.

Figure 7:
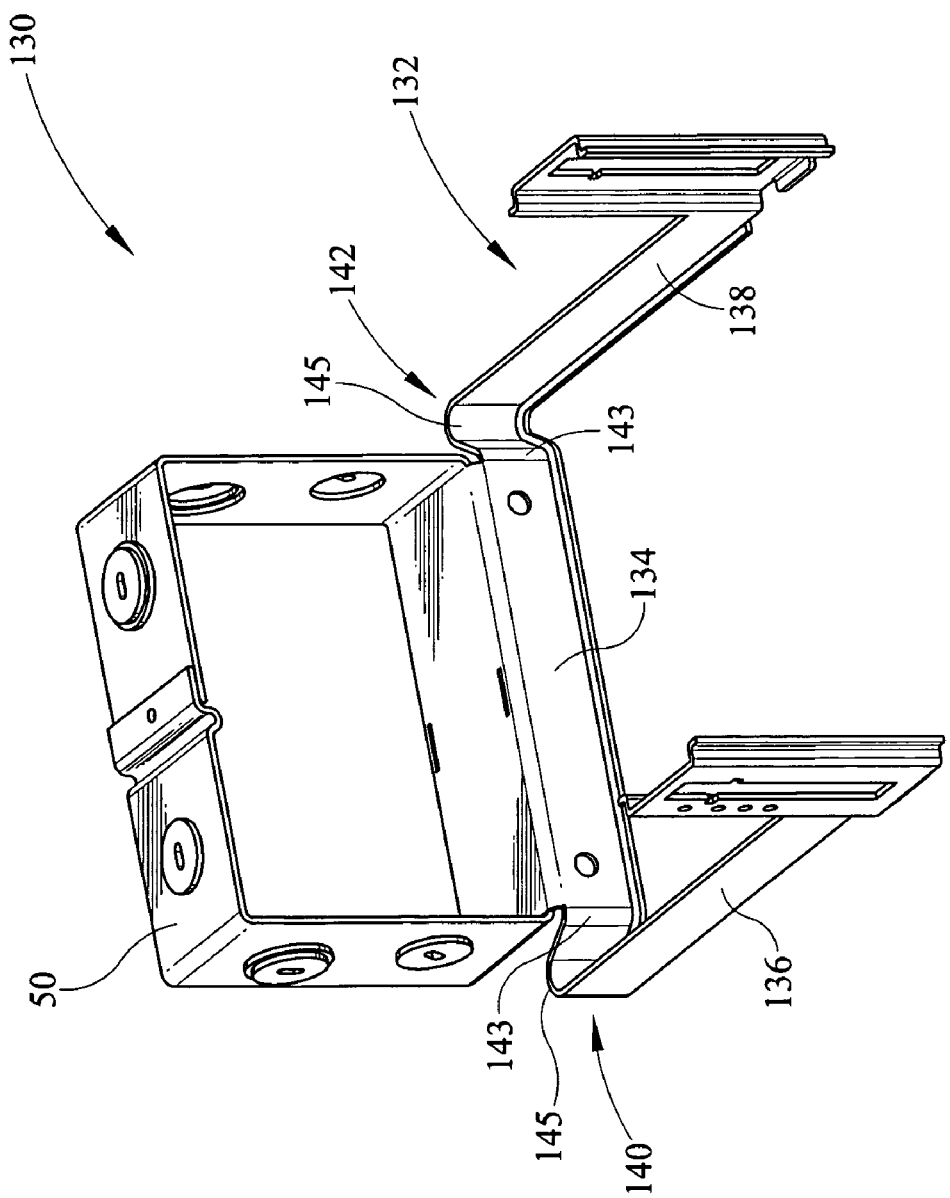
FIG. 7 is a perspective view of a second alternative embodiment.

Referring now to FIG. 7, a first alternative embodiment of a fixture frame 130 is depicted comprising elbows 140, 142 which are formed during manufacture of the product in order to receive the aperture ring of a smaller size than that of FIG. 1. The elbows 140, 142 are bent in a manner which is different from the ninety degree (90°) bend shown in FIG. 2. According to the second embodiment, elbows 140, 142 each comprise a first bend 143 and a second bend 145. The first bend 143 extends from the first arm portion 134 toward the junction box 50. The second bend 145 is greater than 90 degrees and turns toward a distal end of the second and third arm portions, away from the junction box 50. Accordingly, the first bend defines a first obtuse angle and the second bend defines an acute angle to provide a pre-selected distance between the second and third arm portions 136, 138. With this first alternative embodiment, the elbows 140,142 design effectively shortens the frame arm length 32 so that the preselected distance between the second frame arm portion and the third frame arm portion is decreased, as compared to the first embodiment of FIG. 2. With this design, the frame arm 132 is sized to receive a ring aperture of a smaller diameter than the ring aperture 16 of Figure with fixture frame 30. Further, the frame 130 may be formed of the same material and the same blank as used to form the fixture frame 30. By merely changing the elbow bending step during manufacturing, the blank may be shaped to form a ring aperture of a larger or smaller size.

Figure 8:
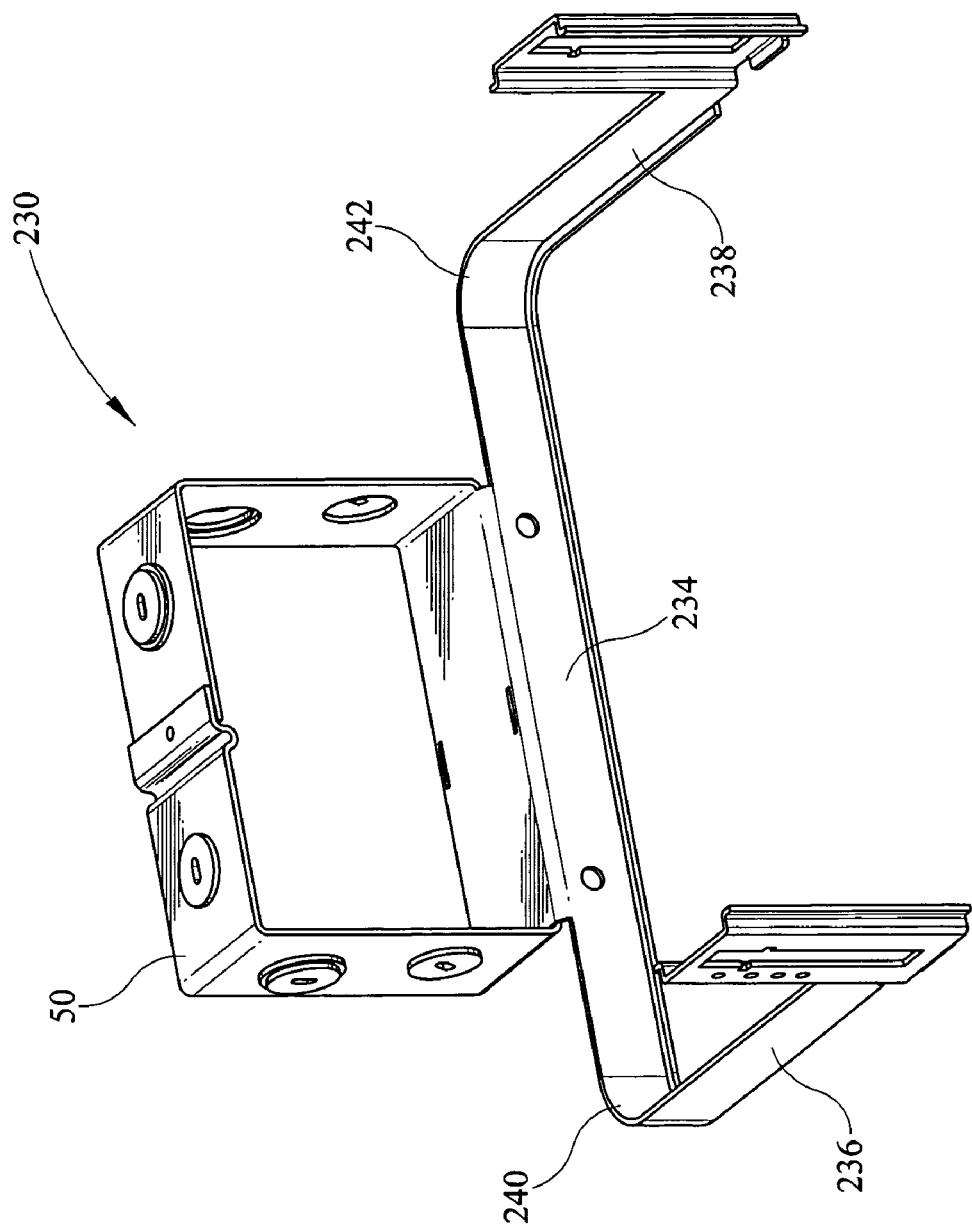
FIG. 8 is a perspective view of a third alternative embodiment.

Referring now to FIG. 8, a second alternative fixture frame 230 is depicted. The fixture frame 230 comprises a junction box as well as a frame arm 232 defined by a first arm portion 234 having first and second ends integrally connected to the junction box 50. The frame arm 234 further comprises second and third arm portions 236,238 connected by elbows 240,242 to first and second ends of the first arm portion 234. The frame arm 232 defines a substantially U-shaped structure as shown in the fixture frame 30 of FIG. 2 such that the second and third arm portions 236,238 are parallel. However, the second and third arm portions 236, 238 are spaced apart a preselected distance further than the fixture frame 30 (FIG. 2) or fixture frame 130 (FIG. 7) so as to receive an aperture ring having a larger diameter than the fixture frame 30 or the fixture frame 130. Accordingly, the first arm portion 234 is longer than that of the first arm portion 34 (FIG. 2) or the first arm portion 134 (FIG. 7). Elbows 240, 242 extend between the first arm portion and the second and third arm portions, respectively. By lengthening the first arm portion 234 and locating ninety-degree (90°) elbows 240,242 at first and second ends of the first arm portion 234 the preselected distance between the first arm portion 236 and the third arm portion 238 and mounting brackets 60 is widened to receive an aperture ring of a larger diameter than the fixture frame 30 and first alternative fixture frame 130. Otherwise stated, the exemplary embodiment of FIG. 8 moves the elbows 240,242 laterally along the first arm portion 234 and away from the junction box 50 in order to widen the distance between the second arm portion 236 and third arm portion 238. However, this embodiment is formed from the same blank as the fixture frames 30 and 130 but can accept different sized aperture rings by merely changing the elbow 240,242 configuration.

Figure 9:
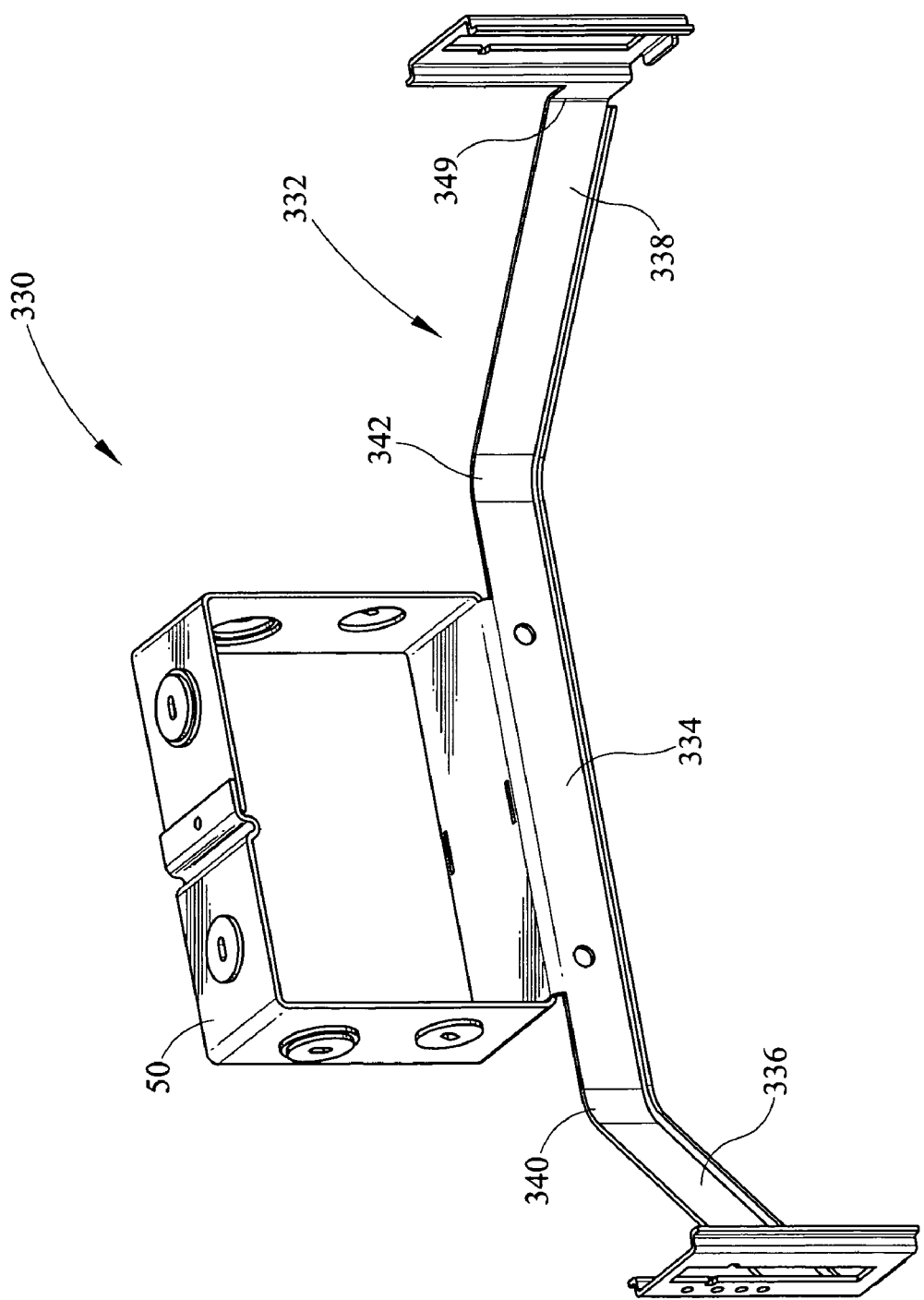
FIG. 9 is a perspective view of a fourth alternative embodiment.

Referring now to FIG. 9, a third alternative embodiment is depicted. A fixture frame 330 comprises a junction box 50 and a substantially U-shaped arm 332. The arm 332 comprises a first portion 334 and opposed second and third arm portions 336, 338 respectively. The second and third arm portions 336, 338 are disposed at first and second ends of the first arm portion 334 by elbows 340, 342, respectively. The first elbow 340 and second elbow 342 are defined by obtuse angles as measured between the inside surface of the second arm portion 336 or third arm portion 338 and the inner surface of the first arm portion 334. By forming the frame arm 332 in such a manner, the mounting brackets 60 are spaced apart at a pre-selected distance to receive an aperture ring of a size larger than the previously described embodiments. Since the second and third arm portions 336,338 are not parallel as in the previously described embodiments, clip elbows 349 are formed at distal ends of the second and third arm portions 336,338 so that the clip mechanisms 14 are parallel for proper connection of the aperture ring 16. One of ordinary skill in the art should recognize that the fixture frame 330 is also formed from the blank (FIG. 3) which is utilized to form the previously described embodiments.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A fixture frame, comprising:
a frame arm having a first end and a second end;
said frame arm further comprising a first elbow and a second elbow between said first end and said second end;
a junction box integrally connected to said frame arm between said first elbow and said second elbow;
said frame arm having multiple bend positions defining said first and second elbows;
said fixture frame formed from a single blank;
said frame arm further extending from said elbows to mounting means for receiving aperture rings of multiple diameters at two opposed locations.

2. The fixture frame of claim 1, said frame arm being substantially U-shaped.

3. The fixture frame of claim 1, said frame arm being formed to receive multiple ring apertures sizes.

4. The fixture frame of claim 1, said mounting means being a mounting bracket.

5. The fixture frame of claim 1, said frame arm having said multiple bend positions to allow mounting of various sizes of aperture ring.

6. A fixture frame, comprising:
a junction box integrally formed with a frame arm;
said frame arm having first and second ends, said junction box disposed between said first and second ends;
said frame arm having multiple bend positions defining first and second elbows;
said junction box and said arm formed from a single blank
said ends capable of receiving multiple aperture ring sizes.

7. The fixture frame of claim 6, said frame arm being substantially U-shaped to engage an aperture ring at two opposed positions.

8. The fixture frame of claim 6 further comprising a mounting bracket at each end of said frame arm.

9. A fixture frame, comprising:
a junction box formed from a blank;
an integrally connected frame arm connected to said junction box and formed from said blank;
an elbow disposed along said frame arm, said frame arm extending beyond said elbow to an end for receiving an aperture ring.

10. A fixture frame for multiple ring aperture sizes, comprising:
a junction box and a substantially U-shaped frame arm integrally connected to said junction box;
said frame arm having a first arm portion with first and second opposed ends;
said frame arm having a second arm portion and a third arm portion;
first and second elbows disposed at said first and second ends, respectively, of said first arm portion connecting said second and third arm portions to said first arm portion;
said elbows being formable so that said frame arm can receive a plurality of ring aperture sizes.

11. A fixture frame, comprising:
a junction box and a frame arm formed from a single metal blank;
said frame arm having a first arm portion, a second arm portion and a third arm portion defining a substantially U-shape;
said junction box integrally connected to said first arm portion;
said frame arm having elbows disposed between said first arm portion and said second arm portion and said first arm portion and said third arm portion;
said elbows being formable in various positions to vary a preselected distance between said second arm portion and said third arm portion.

12. A method of forming fixture frame, comprising:
a fixture frame having a junction box and an integral frame arm wherein said fixture frame is formable from a single blank of material to receive multiple aperture ring sizes:
forming one of said junction box and said frame arm from said single blank in a progressive die;
forming the other of said junction box and said frame arm from said single blank in a progressive die;
forming said frame arm to receive one of said multiple aperture ring sizes in a secondary tooling.

13. A fixture frame arm assembly, comprising:
a frame arm having a first end and a second end;
a junction box integrally connected to said frame arm and disposed between said first end and said second end;
a first elbow disposed between said junction box and said first end;
a second elbow disposed between said junction box and said second end;
said junction box and said frame arm formed from a single blank;
said elbows capable of being formed at various locations along said frame arm such that said first and second ends may receive aperture rings of various diameters.

* * * * *